United States Patent
Tocci et al.

(10) Patent No.: US 8,560,547 B2
(45) Date of Patent: Oct. 15, 2013

(54) SYSTEM AND METHOD FOR PROVIDING LIVE SCORING INFORMATION AND STATISTICAL DATA

(75) Inventors: Patrick Tocci, Litiz, PA (US); Jordon Griffith, Manheim, PA (US); Jim Harkless, Sinking Spring, PA (US); Joseph Keer, Sinking Spring, PA (US); Michael Moyer, Manheim, PA (US)

(73) Assignee: National Wrestling Coaches Association, Manheim, PA (US)

( * ) Notice: Subject to any disclaimer, the term of this patent is extended or adjusted under 35 U.S.C. 154(b) by 1 day.

(21) Appl. No.: 13/385,584

(22) Filed: Jan. 7, 2011

(65) Prior Publication Data
US 2012/0197947 A1 Aug. 2, 2012

Related U.S. Application Data

(60) Provisional application No. 61/366,915, filed on Jul. 22, 2010.

(51) Int. Cl.
*G06F 7/00* (2006.01)
*G06F 17/30* (2006.01)

(52) U.S. Cl.
USPC ............................ 707/737; 707/740; 707/752

(58) Field of Classification Search
USPC ........................................ 707/737, 740, 752
See application file for complete search history.

(56) References Cited

U.S. PATENT DOCUMENTS

| | | | | |
|---|---|---|---|---|
| 7,303,472 | B2 * | 12/2007 | Guagliardo | 463/40 |
| 7,607,403 | B2 * | 10/2009 | Walters | 116/222 |
| 2008/0220870 | A1 * | 9/2008 | Zavolas et al. | 463/40 |

* cited by examiner

*Primary Examiner* — Mariela Reyes
(74) *Attorney, Agent, or Firm* — Miles & Stockbridge, P.C.

(57) ABSTRACT

A scorebook system and related methods for receiving optimal performance and weight classification data for wrestlers of any age and background, creating brackets for a tournament event, providing live scoring and real-time statistical data at a wrestling meet and thereafter, analyzing and reporting statistical information about the meets, teams and wrestlers, and compiling and providing media information about a wrestling meet.

20 Claims, 3 Drawing Sheets

SYSTEM AND METHOD FOR PROVIDING LIVE SCORING INFORMATION AND STATISTICAL DATA

CROSS-REFERENCE TO RELATED APPLICATIONS

This application is a non-provisional application claiming priority to U.S. Provisional Application No. 61/366,915, filed Jul. 7, 2010.

TECHNICAL FIELD

The present invention relates to a system and method for a school or team to manage information about a wrestling team, and provide live scoring information and up-to-date and real-time statistical data at a wrestling meet and thereafter.

BACKGROUND

Wrestling meets are conducted with a plurality of weight classes. A wrestling team provides a wrestler or wrestlers for some or all of the weight classes. The wrestlers in a particular weight class compete against each other, and score points for their team based on winning matches and on how they win a match. While the team score continually changes as each match is completed, team results usually are not updated on a continuous, live basis. Thus, participants and observers usually are not fully aware of the current scores of the teams.

An example of a scoreboard for providing team scoring information at a wrestling meet is disclosed in Walters, U.S. Pat. No. 7,607,403, which is incorporated herein in its entirety by specific reference for all purposes. The scoreboard is electronically connected to a controller on the scorer's table. Information such as team names and team scores are inputted into the controller, and displayed on the scoreboard. It also may calculate and display remaining potential points possible for each team. However, this scoreboard does not record or analyze information about a wrestler or a team.

Further, there is no comprehensive system for managing information about a wrestling team or individual wrestlers, scheduling competitive meets and tournaments, and analyzing and reporting statistical information about the meets, teams and wrestlers. It is to such a need that this invention is addressed.

SUMMARY OF THE INVENTION

In one exemplary embodiment, the present invention comprises a scorebook system and related methods for receiving optimal performance and weight classification data for wrestlers of any age and background, providing live scoring and real-time statistical data at a wrestling meet and thereafter, analyzing and reporting statistical information about the meets, teams and wrestlers, and compiling and providing media information about a wrestling meet. The system and methods disclosed herein are suitable for athletes of any age and background. While the system and methods herein are described in the context of wrestling, particularly at a high school or college level, they also may be applied to any sport or activity.

In one exemplary embodiment, the scorebook system is a computer-based application, and may be accessed through the Internet. The scorebook system receives assessment data and roster information of every assessed wrestler for a school or team. Competitions may be entered through a Team Schedule component. Results of competitions may be entered after the competition through a Competition Data Entry (CDE) component, or live through a Live Scorebook component. Results are used to update Team Information and Wrestler Information pages, and statistical information summaries. A variety of reports may be generated.

Additional objects, features and advantages of the invention will be set forth in the description which follows, and in part, will be obvious from the description, or may be learned by practice of the invention. The objects, features and advantages of the invention may be realized and obtained by means of the instrumentalities and combination particularly pointed out in the appended claims.

DETAILED DESCRIPTION

In accordance with the exemplary embodiments discussed below, a system and related methods are disclosed for receiving optimal performance and weight classification data for wrestlers of any age and background, providing tournament bracketing, live scoring, and real-time statistical data at a wrestling meet and thereafter, analyzing and reporting statistical information about the meets, teams and wrestlers, and compiling and providing media information about a wrestling meet. An embodiment of this system will be referred to hereinafter as the "scorebook system." The system and methods disclosed herein are suitable for athletes of any age and background. While the system and methods herein are described in the context of wrestling, particularly at a high school or college level, they also may be applied to any sport or activity.

Figure 1:
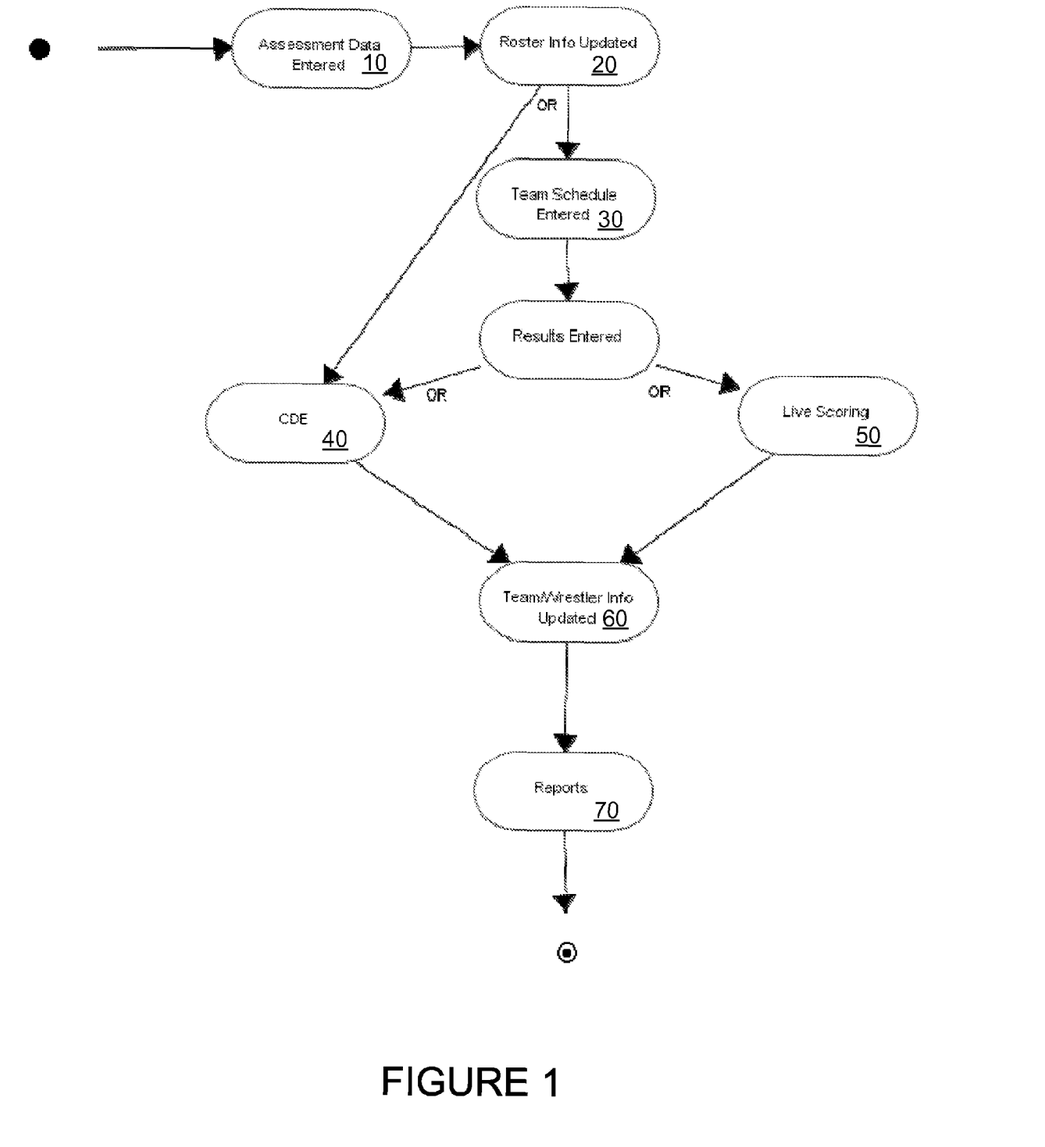
FIG. 1 is a diagram of the components of a scorebook system in accordance with an exemplary embodiment of the present invention.

In one exemplary embodiment, the scorebook system is a computer-based application, and may be accessed through the Internet. As shown in FIG. 1, the scorebook system receives assessment data 10 and roster information 20 of every assessed wrestler for a school or team. Competitions may be entered through the Team Schedule component 30. Results of competitions may be entered after the competition through the Competition Data Entry (CDE) component 40 or live through the Live Scorebook 50 component. Results are used to update Team Information and Wrestler Information pages 60. A variety of reports may be generated 70.

The roster information and assessment data may be received in the form of an "alpha master report" from a system such as the Optimal Performance Calculator (OPC), disclosed in U.S. application Ser. No. 11/861,069, which is incorporated herein in its entirety by specific reference for all purposes. The alpha master report contains assessment data for every assessed wrestler for a team or school, including, but not limited to, the following data fields:

1. School Name.
2. School Address.
3. Athlete Last Name—Populated from the initial athlete assessment.
4. Athlete First Name—Populated from the initial athlete assessment.
5. Alpha Date—The date of the initial athlete assessment.

6. Alpha Weight—The body weight taken at the time of the initial athlete assessment.

7. Alpha % Body Fat—The body fat % taken at the time of the initial athlete assessment.

8. Minimum Wrestling Weight Prior to Variance—Calculated by the OPC based on the initial athlete assessment.

9. Minimum Wrestling Weight After Variance—If a state exception for variance is in effect, this is calculated as (Minimum Wrestling Weight Prior to Variance)—(Variance).

10. Final Minimum Wrestling Weight—If a state exception for variance is in effect, this is Minimum Wrestling Weight After Variance, otherwise this is Minimum Wrestling Weight Prior to Variance.

11. Minimum Weight Class—This is calculated as the closest weight class above the Final Minimum Wrestling Weight, and may be affected by a state rule with a deadline date, as well as the state's available weight classes.

12. First Date at Minimum Weight Class—This is the first date the Final Minimum Wrestling Weight is below or equal to the Minimum Weight Class.

The scorebook system uses the alpha master report to pull the rosters and assessment data into the Competition Data Entry (CDE) and Live Scorebook (both web-based and offline) components. The team rosters may be pulled from roster management, a team roster grid table, or the original assessment data. The roster data may be associated with a "Master ID" for a school, which is associated with a particular School Name and School Address.

The Team Schedule component is used to enter all team competitions. This component may be used to enter information about a dual meet or tournament, or to join a previously-created tournament. In one embodiment, this component comprises the following data fields:

1. Competition Type—The user enters whether the competition is a dual meet or a tournament.
   a. High School—The user can either choose to select a dual meet or a tournament and enter the remaining fields.
   b. College—The user may only submit information for new dual meets. If a tournament is needed, they may select to enter a tournament via a button on the Team Schedule page for a tournament already created. In general, only an administrative user, such as a tournament administrator, can create tournaments.

2. Event Name/Opponent Name—Text field with name of the event.

3. Home/Away—Describes whether the team will be home or away for this particular competition.

4. Match Date—Text field with the date of competition in an accepted format (e.g., MM/DD/YR). A calendar option for the user to select a date from a pop-up or windowed calendar may be provided.

5. Match Time—Text field with the start time of the competition.

6. Location—Text field with the specific location of the competition.

7. Canceled—Defaults to "No" but may be changed to "Yes" in event of a cancellation.

8. Postponed—Defaults to "No" but may be changed to "Yes" in event of a postponement.

9. Match Notes—Text field describing any further notes on the competition.

When a new competition is created through the Team Schedule component, it will be reflected on the CDE page, Team Information page, and the Live Scorebook Dashboard component. The Team Schedule component populates the Live Scorebook setups page with competitions. In one embodiment, the CDE page will override anything done through the Team Schedule component. For example, once a competition has been scored, a user may edit the team schedule, but can only delete information through the CDE screen.

The system further comprises a Section I Report form, comprising assessment data used by the scorebook system when displaying reports, statistics, or the like. It is used by the various report components and Wrestler Information pages. The Section I Report includes, but is not limited to, the following data:

1. First Name
2. Middle Initial
3. Last Name
4. Gender
5. Division—This can be prepopulated based upon the Master ID.
6. Conference—This can be prepopulated based upon the Master ID.
7. Eligibility Year in School—In one embodiment, this is presented as a drop-down menu: FR (freshman), RSFR (red-shirt FR), SO (sophomore), RSSO (red-shirt SO), JR (junior), RSJR (red-shirt JR), SR (senior), RSSR (red-shirt SR), and Grad (graduate).
8. First Time on NCAA Squad List—Yes or No response, which can be presented as a drop-down menu.
9. Weight Class Wrestled Previous Year
10. Date of Birth—Text field with the date in an accepted format (e.g., MM/DD/YR). A calendar option for the user to select a date from a pop-up or windowed calendar may be provided.
11. Date of Assessment—Text field with the date in an accepted format (e.g., MM/DD/YR). A calendar option for the user to select a date from a pop-up or windowed calendar may be provided.
12. Hydration Level
13. Alpha Body Weight (BW)
14. Assessment Data
15. Skinfold Measurements
16. Body Density (BD)
17. Body Fat % (BF)
18. Fat Weight (FW)
19. Fat Free Weight
20. Lowest Allowable Weight
21. Number of Days Between Date of Assessment and Deadline Date by Governing Body
22. Lowest Allowable Weight
23. Minimum Wrestling Weight
24. Designated Weight Class
25. Person Performing Assessment
26. Person Entering Information The Roster Management component is used to input and edit information about a team roster and members of that team. In one embodiment, access to this component is limited to a user with a high school or college Master ID. Edits or modifications in this component are reflected in all competition entry forms, wrestler reports, and Wrestler Information pages. This information includes, but is not limited to, the following data:

1. Wrestler Name—Text fields to allow for first, middle, last, and nick name entries.
2. Year in School—May be presented as a drop-down menu to select the current year in school (e.g., FR, RSFR, SO, RSSO, JR, RSJR, SR, RSSR, Grad).
3. Previous Year Weight—Text field used to enter previous year weight class. This may be used to populate the same entry on the Section I Report.
4. Hometown/State—Text field (or fields) used to enter the city and state of the wrestler's home.

5. Date of Birth—Date field, which may have a calendar option.

6. Gender—"Male" and "Female" selections, which may be presented as a drop-down menu.

7. Two-Sport Athlete—"Yes" and "No" selections, which may be presented as a drop-down menu.

8. Eligibility—"Eligible" and "Ineligible" selections, which may be presented as a drop-down menu.

9. Email—text field used to enter athlete's email address.

The Team Roster Grid component presents all information about the team roster in a grid format. It may be used by a user with a Master ID to view and edit information, and depending upon state affiliation regulations, to add and delete wrestlers (some state affiliations only permit the addition or deletion of athletes through assessment forms). In one embodiment, name, grade, minimum weight class (MWC), and weight class may be populated directly from the initial athlete assessment form. Names and grades that are exported to various wrestler reports may be edited here to display properly on reports and information pages.

The Weigh-In component is used to input and edit information about a member of a team. The user selects the date of the competition from a calendar list, which may be presented as a list or a calendar, and selects the name of the event. The system may present a drop-down selection if there is a 1 or 2 pound allowance in effect for the date of the competition. The system thereupon presents a screen that shows all wrestlers in the event with an assessment, their eligible weight class for that date of competition, and their lowest eligible weight class for that date of competition. In one embodiment, the system may default the wrestler weight class to their eligible weight class for that date of competition. A coach user may have the option to change the weight class for a wrestler, by inputting the class or selecting the class from a drop down list.

The system provides the option of downloading printable weigh-in forms for the event or competition, which may be in any format, including but not limited to a .pdf or .doc file. In one embodiment, the form includes, but is not limited to, the following information: date of competition; name of event; weight class; wrestler's name; eligible weight class; minimum wrestling weight class; a line to write in the actual weight at the weigh-in for the event; the last recorded weigh-in weight; and the date for the last recorded weigh-in weight. These forms may then be used at the event weigh-in. After the event or match, a user, such as a coach, enters the actual weights from the event into the system.

The system then processes the actual weights. If the new actual weight recorded is higher than the projected weight for that day, the weight loss plan component re-calculates the weight loss plan using that actual weight by the appropriate formula. As described elsewhere, in one embodiment the formula used is (actual weight*0.015). This will change the projected weights and eligible weight class. This processing may be turned off or on for particular states, regions, and the like.

The system also may generate a weigh-in form report that shows all actual weights recorded for a wrestler or team members. Particular schools, regions, states, and the like may have the option of allowing opposing teams to see this information. The system also may generate automatically a "WLP violation report", which shows if a wrestler violates their eligible weight class for a competition.

The scorebook system also comprises an administrative section. In one embodiment, an administrative user may use an "OPC Access" button or form in the administrative section to grant or remove scorebook access roles for a particular member or user for a school. Once a school has authority to use the scorebook system, an authorized user can go to the Live Scorebook User Dashboard through the OPC Coaches tab to set up matches to be scored, score matches (e.g., by using the web-based Live Scorebook), or run team specific statistic reports.

Figure 2:
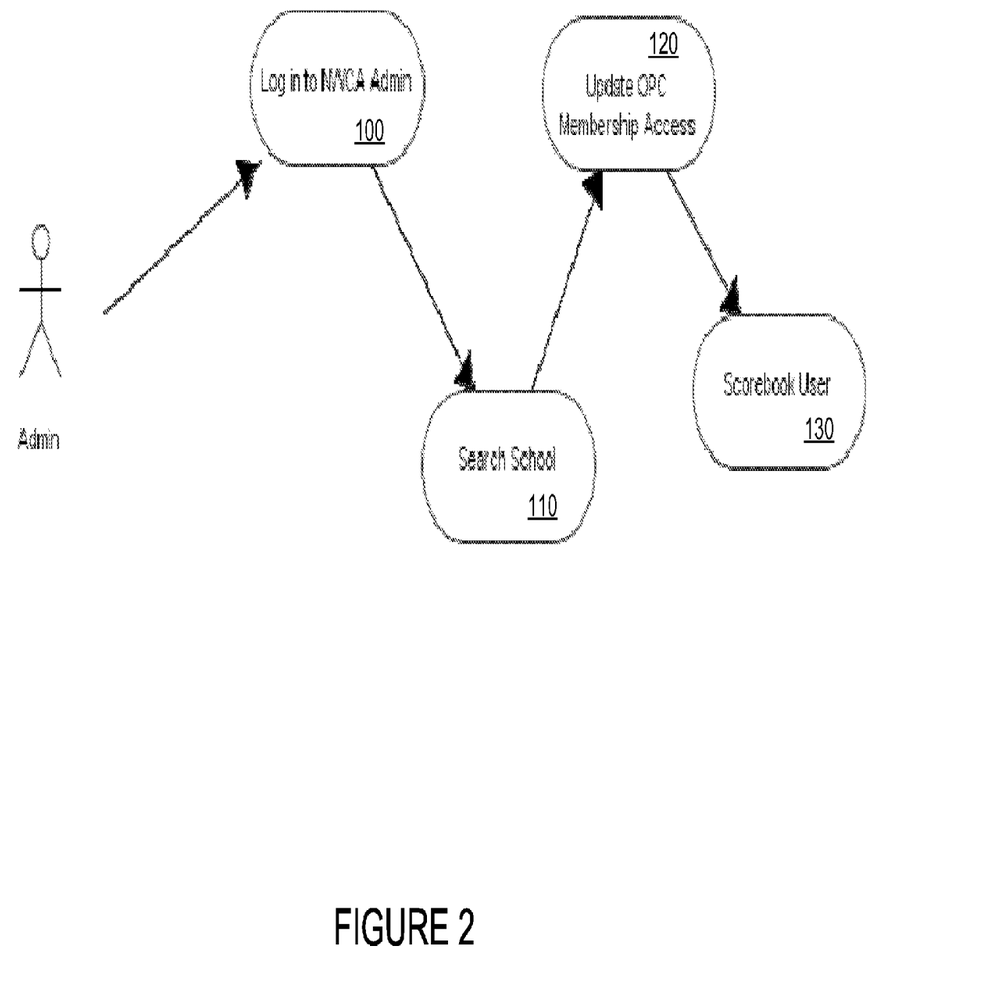
FIG. 2 is a diagram of the membership administrative OPC access process in accordance with an exemplary embodiment of the present invention.

As shown in FIG. 2, the administrative user logs into the membership administrative site 100 to access the members list. The user searches and locates the correct school 110, then updates the OPC Membership Access 120, enters the required form fields, and selects the scorebook user role or roles. This updates the security settings for that scorebook user 130. The form fields include, but are not limited to, the following:

1. Master ID—The Master ID of the member (i.e., school), typically prepopulated.

2. Enter Login ID—The coach's login ID.

3. Enter School Name—The school name as it appears on the membership card.

4. Select Roles—The scorebook user role selection grants access to parts of the scorebook system to the school and coach.

5. Update Roles for User—This button saves all information and grants access to the school and coach to use the scorebook system.

The Competition Date Entry (CDE) component comprises forms for newspaper data submission, dual competition data entry, tournament data entry, and season record information. With regard to newspaper data submissions, in one embodiment the user clicks on a button or icon to enter newspaper emails to which match results will be sent. The entry fields may include both newspaper name and newspaper email, and the ability to add, edit, and delete either field. The newspaper data is stored in a system database, with each newspaper record given a newspaper ID, a member state (i.e., the state associated with the logged-in user), a newspaper name, a newspaper email address, and an add date in the database.

Data entry for dual competition meets for high school may be initiated in two ways. If the Team Schedule component has been populated by the user, the competition will appear on the CDE page. If not, a user can enter a new competition at this point, although it may not be populated to the Team Schedule (determined by the state association rules and regulations concerning data entry of team schedules). Updating the CDE screen updates other tables in the database, such as statistical information for each wrestler from the logged-in school's roster.

The high school dual meet CDE form includes, but is not limited to, the following data:

1. Date—Date of competition; text field with a calendar option.

2. Type of Competition—Prepopulated as Dual Meet for this situation.

3. Level—Selection of "Varsity," "Freshman," or "JV" (Junior Varsity), which may be presented as a drop-down menu.

4. School—Prepopulated with the school name associated with the user.

5. Opponent Name—Text field for entry of the name of the opponent school. In one embodiment, this may be presented as a drop-down list of all schools in the same state affiliation. If out of state, direct entry may be required.

6. Your Team Score—Text field allowing for user entry of total team score.

7. Opponent Team Score—Text field allowing for user entry of opponent team's score.

8. Location—Text field allowing for user entry of location of competition; it may be prepopulated if the competition appears on the Team Schedule and the "Location" field was previously entered.

9. Event Name—Text field allowing for user entry of name of competition; it may be prepopulated if the competition appears on the Team Schedule and the "Event Name/Opponent Name" field was previously entered.

Detailed meet results are entered in a form including, but not limited to, the following fields:

1. Competition Weight Class—Prepopulated with the weight classes used by the state affiliation (typically 14 to 15).

2. Wrestler Name—A drop-down menu with the school's wrestlers listed from the alpha master report in order of Minimum Weight Class (or alphabetically). In one embodiment, the drop-down default may be "Forfeit" with the text box being blank.

3. Actual Weight—This field is populated once the weigh-in form has been completed with actual weigh-in weight entered.

4. Opponent's Name—Drop-down menu with opponent school's wrestlers listed from the opponent's alpha master report in alphabetical order (or by Minimum Weight Class). In one embodiment, the drop-down default may be "Forfeit" with the text box being blank.

5. Win/Loss—Drop-down list with W (Win), L (Loss), or NM (No Match), with the default being NM. Win or Loss is determined from the perspective of the logged-in school or team doing the entry.

6. Win Type—Drop-down list with all win types available for high school competitions, with default being NM.

7. Score—Text field to enter in score of team doing the entry.

8. Opponent Score—Text field to enter score of opponent.

9. Time—Text field to allow for entry of time for various win types.

In one embodiment, the weight class that is pulled for reports and information pages reflects the lowest weight wrestled during the season. If no matches were wrestled, the weight class is the eligible weight class. If a competition entered is a new low weight class wrestled for a specific wrestler, the information and statistical pages are changed to show this as the weight class of the wrestler.

Data entry for dual competitions for college meets is equivalent to data entry for high school results, as described above, with several additions or modifications. One addition is an exhibition data entry table; data entered into this table is not entered into the system as an official match. In another embodiment, the entry forms use a button that triggers a text box entry field instead of a drop-down menu populated by the database. Results entered in this component are reflected inside the database, and are updated to season records, statistics, and wrestler and team information pages.

Data entry for tournament competitions for high school tournaments comprises forms similar to those used for dual competitions, with some changes. The data entry form to be completed for tournament details includes, but is not limited to, the following information:

1. Date—date of competition entered in text area with a calendar option.

2. Type of Competition—tournament type, typically prepopulated from Team Schedule.

3. Level—Selection of "Varsity," "Freshman," or "JV" (Junior Varsity), which may be presented as a drop-down menu.

4. School—Name of school; may be prepopulated.

5. Team Score—Score of team doing entry.

6. Team Finish—Ranking of finish of team doing entry.

7. Tournament Name—Name of the tournament; typically prepopulated from Event Name if the Team Schedule was completed.

8. Location—Location of the tournament; typically prepopulated from Location field if Team Schedule was completed.

The following detailed information is entered once the tournament information above has been entered:

1. Weight Class—Weight class of the individual wrestler; a drop-down menu with all available state association weight classes may be used.

2. Wrestler Name—Name of the individual wrestler; a drop-down list with all of the team's roster may be presented. The name may be prepopulated from the alpha master report and ordered by MWC (or alphabetical).

3. Actual Weight—Actual weight of the wrestler; does not get inserted until weigh-in form is updated with weigh-in weight.

4. Opponent's School—Text box for entry of opponent school; may be presented as a drop-down menu of all in-state schools.

5. Opponent's Name—Text box for entry of opponent's name; drop-down menu may be presented if a drop-down menu was presented for Opponent's School.

6. Win/Loss—W (Win), L (Loss), or NM (No Match); may be presented as a drop-down list.

7. Win Type—All available high school win types; may be presented as a drop-down list.

8. Score—Text field for wrestler's match score.

9. Opp. Score—Text field for opponent's match score.

10. Time—Text field to allow for entry of time for various win types.

11. Tournament Finish—Rank of finish in tournament, typically places 1-8 and a "Did Not Place" (DNP) selection; may be presented as a drop-down list.

The form also may contain a "New Wrestler" button that causes a blank match entry form to be presented to the user. A "Next Match" button may be used that also causes a blank match entry form to be presented, but automatically populates it with the Weight Class and Wrestler Name from the previous entry. This permits the user to sequentially enter match results for a given wrestler for the entire tournament.

When a tournament is populated with results, it is reflected in other tables in the database, and used to update wrestler and team records and statistics. When entering in a competition result, if the weight wrestled of a specific wrestler is the lowest of the year, the weight class on the wrestler reports and statistics is updated to show this weight class for the wrestler.

Data entry and result recording for college tournament competitions is the same as for high school tournaments, except that tournament competition data is entered by an administrative user and is used to prepopulate the tournament selection window.

Season record forms are updated on the same basis as wrestler information page records. Each time a match is updated either via the CDE scoring page or the live scoring system, the season record form is updated (along with the wrestler information pages). The season record forms are populated with the following information, which is pulled from the match results or other sources in the system: competition date; actual weight; weight class; win/loss with the score and the decision; opponent's name and school/institution; and type of competition (e.g., dual meet, or actual tournament name). The following information also may be included: wrestler name; school year; certified weight class; initial assessment date; and date of first day at certified weight class.

The Live Scorebook User Dashboard provides the user the ability to use a computer to set up a specific competition to be scored "live" or by using the live scorebook. The user also can enter statistical data from competitions, score a meet, and run team specific statistical reports. In one embodiment, it is located in a private access area, and comprises four main functions: live coverage meet setup; raw data statistics entry; wrestler statistics report; and team schedule.

In the live coverage meet setup component, the team schedule is populated with each competition having a "select" button or icon next to it (college tournaments also have a "N/A" button). When selecting a competition, the user may proceed to set up and/or score a competition live.

In one embodiment, the user can set up a competition to score using a client-based application (i.e., an Internet connection is not active during the competition). The user may select the competition details "show/edit" button, which presents the user a number of options. This includes options to indicate home/away, mat number, various competition flags, coverage links, and team addendums. Scoring using this client-side application is initiated by indicating "yes" for "to be covered live," and then selecting an opponent. Scoring then proceeds as described below.

If the user desires to score a competition on the Internet, he or she would follow the above steps, and then continue through the remaining steps to score a live match (as described below). The match, when flagged as live, appears on the live results page, and the results page for either high school or college, depending on the Master ID affiliation. The results also are entered into the CDE page for the logged-in user, and used to update season records/statistics, team information, wrestler information, and all other results pages.

The raw data statistics entry component is used to enter raw statistics. When given access to the Live Scorebook User Dashboard, a user can create competitions, enter the results via the CDE page, and proceed to this component to enter statistics about a match. In one embodiment, the user clicks on a "Raw Data Stats Entry" button and is taken to a screen presenting a table similar to the schedule table, with a "select" button to the left of every competition. Selecting the competition opens a page or window showing all of the results that were entered into the CDE page for that competition. The user can then select a match, which opens a "match statistics entry" box or window. The user enters all desired statistics for both "scored" and "allowed" values, and saves the data. These statistics are inserted into various statistics tables in the system database, and also will appear on the appropriate wrestler and team information pages.

In one embodiment, for a wrestler with multiple matches at one event, the statistics only need to be entered as a total for the event under one statistics box. Raw statistics may be updated every 24 hours (or every night) and made available to the public.

The wrestler statistics report component permits a user to obtain a report of the user's team (i.e., the only wrestler names that are displayed are the names on the user's team roster). In one embodiment, the user is presented a number of filtering or sorting options, which may be presented as drop-down menus. Filters include, but are not limited to, school year, gender, any available statistics (same as the raw statistics data entered, along with various win types), weight class, and eligibility year.

The team schedule button on the dashboard is used to direct a user back to the OPC Team Schedule page (described above). This is used as a shortcut in case a competition fails to show as an option (typically because the competition was never entered through the Team Schedule page).

In one embodiment, the entry of roster data depends on whether the team is in, or uses, the OPC system. This applies regardless of the method of scoring or the type of competition.

When a team uses or is in the OPC and chosen as the opponent, the system uses the saved roster information from the OPC alpha master report to pull into the live scorebook system. A text entry (typed-in opponent by user) is allowed in the live scorebook application, but does not save the wrestler to the OPC team's alpha master report. A text entry should only be used in the event a wrestler does not appear on a team. For scoring purposes, a typed-in wrestler is given a wrestler's ID and submitted to a "fake" OPC school in the system.

When a team does not use or appear in the OPC, the user has the ability to type in a school name as the opponent. This creates the school as a "fake" OPC member as if it were a member team. This team is hidden from all public viewing, and is solely used for live scoring purposes. When a competition (e.g., dual meet or tournament) is scored on the live scorebook system using a team that was created in the OPC by the user, the wrestler names are entered as text entries into the scorebook system. Typed-in wrestlers for these created OPC teams are given wrestler IDs and added into the OPC under the created OPC team/school.

Figure 3:
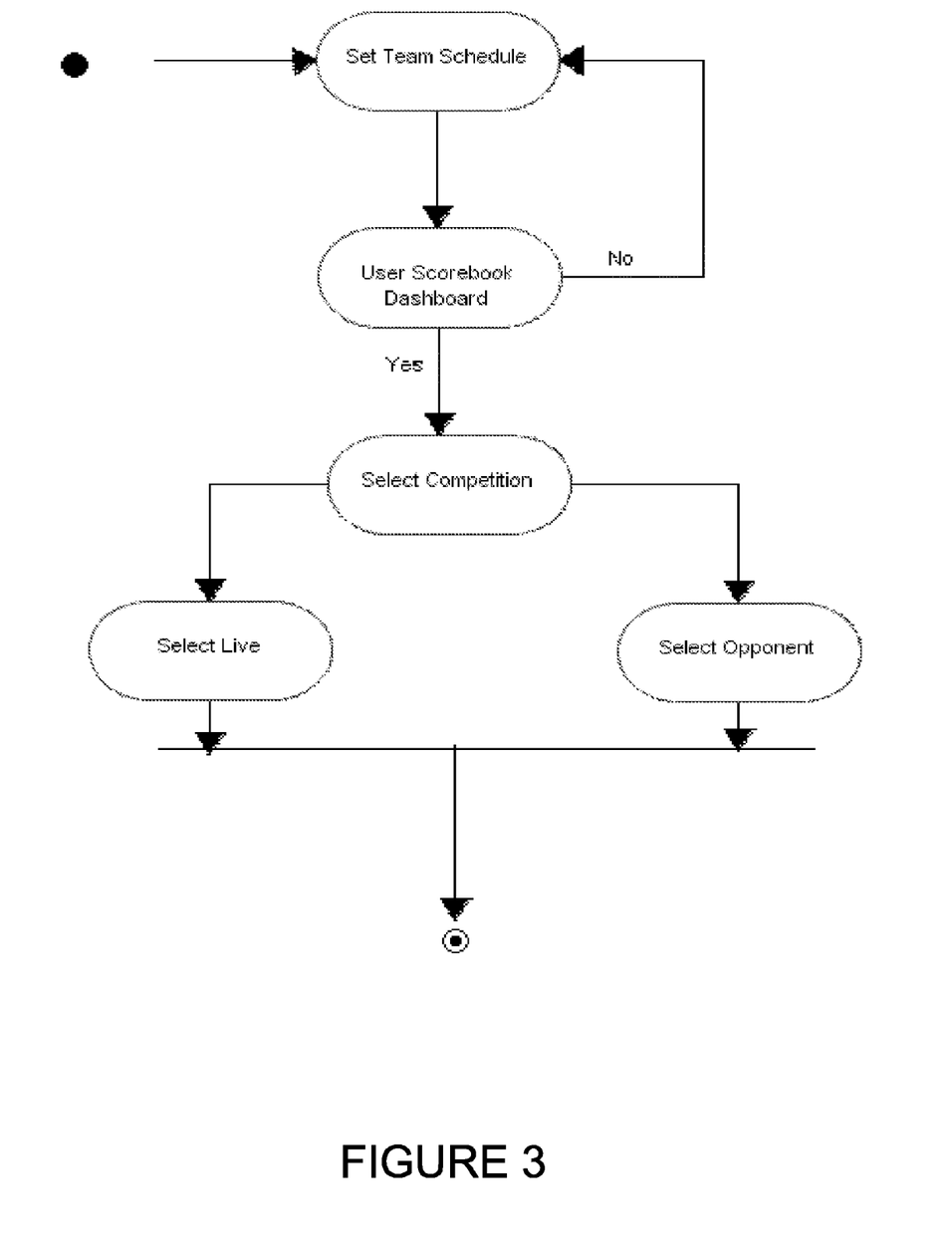
FIG. 3 is a diagram scoring initiation process in accordance with an exemplary embodiment of the present invention.

Live scoring may be accomplished for both dual meets and tournaments. Live scoring may be accomplished through the Internet, or in the case of dual meets, may also be accomplished through a client-side application. FIG. 3 shows the process to begin scoring a competition for both the Internet-based and client-side application. In both cases, the user interacts with the system through a computing device, such as a personal computer.

In order to live score a dual meet using an Internet-based version, the competition must be entered on the Team Schedule, and set up on the live scorebook user dashboard live coverage meet setups (i.e., "To be scored live" is flagged as "yes," and an opponent is selected). The user will then be able to select wrestlers at weight classes to begin scoring (team rosters are pulled from the alpha master report for each team). The competition will show as either high school or college on the Live Coverage and Meet Results pages, depending on the affiliation.

The live score information from the competition will only update to the Team Information page and Wrestler Information page for the team that is logged in and scoring, unless the option was selected to update the opponent. Team scores, results, and statistical data (e.g., win types, takedowns, reversals, cautions, and stall warnings) will be posted to the appropriate information pages as the scoring occurs. Records may be updated overnight, as well as posting on the CDE pages. Statistics records for individual wrestlers may not update until statistics job runs are performed (typically overnight).

Season record forms are updated as the competition is scored (similarly to how they are updated by the CDE component). Various statistics and results database tables may also be updated during the scoring process.

At the completion of the competition, the user marks the match as complete. The option to send results to the newspapers list (set up on the CDE page) also may be presented.

As an alternative to live scoring with a live Internet connection, the user may choose to download a client-side application to score the selected dual meet competition (following the steps described above to set up the competition to be scored live). In one embodiment, the client-side application communicates with the team schedule in order to find a competition entered on the team schedule. The competition is then set up on the live scorebook user dashboard live coverage meet setup (i.e., to be scored live flag is set to "yes", and the opponent is selected). An optional field may be provided to update the score for the opponent (i.e., update opponent's matches and statistics). The above steps may be completed within a web browser, and the user may then proceed to the client-side application to complete coverage of the competition. Once logged in, the user can choose to download the competition to be scored. Flagging the competition to be covered live and selecting an opponent will force the competition to appear the client-side application download window.

After the competition is downloaded, the user can choose to score with or without an active Internet connection, provided the computer on which the application was downloaded is used for scoring. This permits the user to take the computer into an area where there may be no Internet access, or even if the computer is connected to the Internet, to score a match even though the Internet connection may be dropped or erratic.

The application pulls the rosters from the alpha master report for both participating teams. Each matchup saved will be reflected on the match results pages, as well as the CDE, wrestler information, and season record pages. The application sends all statistical data to the team and wrestler information pages as each match is being scored. This includes, but is not limited to, win types, takedowns, reversals, cautions, and stall warnings.

At the conclusion of the competition, the user has two completion options, depending on whether the computer is connected to the Internet at that time. If connected, the user can finalize the competition, and send the results to newspapers immediately. If unconnected, all inputs and transactions are saved as "pending," and are pushed through to the system when the computer is reconnected to the Internet and the user opens the competition to score again. Once done, the pending transactions are finalized as normal.

If the score opponent match option was selected, the system will update the scores for the opponent as well.

Live scoring for tournaments may be accomplished in a similar manner, except that all competition competitors must be flagged to be a participant in the tournament before starting. College affiliations must have the tournament selected on the OPC Team Schedule, which allows the user to select which wrestlers will be competing and at which weight classes. This flags the wrestlers in the database for that tournament ID, and will indicate which rosters are pulled for the tournament scoring application. High school affiliations must select the tournament to compete in, and select the rosters at the tournament.

An administrative user logs in using a tournament administrator ID to use the application, which can be downloaded as a client-side application. Tournament scoring is usually performed by a tournament director and/or designated lead person or administrator for the tournament. Administrative scoring submits results for all competitors.

Tournament directors and/or lead persons or administrators are provided a user name and password into the system and OPC for the tournament. They have the ability pull a file from the OPC that lists all participants chosen by each school. The file may be a simple, comma-delimited text file, and may include, but is not limited to, the following data items: name; school; weight class; wins; losses; grade; wrestler ID; and tournament ID.

Logging in using the tournament administrator ID permits the administrative user to download the competition and pull all rosters selected for this event. The bracketing component or system, which may be integrated with the live scorebook system, or may comprise a separate system or program, may then be implemented to create brackets for the tournament. The wrestler IDs and tournament ID must be the same in both the tournament bracketing component and the live scoring system.

Seeding and brackets are created in the tournament bracket component. The tournament bracketing system determines the number of places for each weight class. The brackets can be created in a PDF or html format (or similar format) that can be posted to the web. Brackets can be set up to have pre-bracket placement, random draw or complete seeding. After brackets are created, bout numbers are created in the system. These are used to push information to the live scoring system, which receives the bout number via either a web interface or a direct connection to the database to score the match. The user does not select the wrestler's names or weights. They select the next bout number that is sent to the corresponding mat. The bout number sends the wrestlers names, school, bout ID and weight class. The scoring system pulls the correct IDs for each wrestler as determined by the bout ID.

The live scoring system scores the match and declares a winner. The live scoring system, via a direct database connection or web interface, sends back the winning wrestler for the corresponding bout number. This includes the winning wrestler name, ID and score of win. The tournament bracket system then updates the brackets accordingly. The wrestler advances to the new corresponding spot in a tournament bracket. The losing wrestler could either be eliminated from the bracket or placed in a new spot in the bracket.

As match winners are created, the team score is updated based on the tournament's settings. The tournament bracketing system updates the official team score for each team. Official team scores are updated using point value as in the high school and college rule books.

Brackets may have a link on them that displays the Live Coverage Meets page for the corresponding match. Further links may be provided to pages on various websites that give all results for the event. Thus, a fan is able to view the results by round, weight class, and school.

The tournament application posts results, records, statistics, and other match information just as in the dual meet application, except that the information is posted for all competitors (as opposed to just the authenticated, or logged-in, user). All information also may be posted to Meet Results and Live Coverage Meets pages, season record forms, and CDE pages. As a result, team users should not have to report scores or statistics to their OPC pages.

In yet another embodiment, the system provides for self-scoring tournaments. The may be provided if a user scores only their own wrestlers' matches. This submits results (e.g., statistics, wins, losses, etc.) for the team, which is authenticated in the system when logged in.

A tournament for self-scoring is set up in the OPC as a tournament event for the team logged into the OPC. The cover live or "use the scorebook" option is selected as "yes" and saved. The user proceeds to the user dashboard as describes above, and selects the tournament to be scored. The user may filter and select all participating teams for the tournament, which pulls OPC roster information into the application. Once teams are selected and saved, the user proceeds to the scorebook application, and downloads the competition, which makes the roster information available when scoring the tournament. All information submitted through this method is inserted into the system databases and pages only for the logged-in team.

The scorebook system further comprises Team Information and Wrestler Information pages. In one embodiment, the pages are the same for both college and high school teams, with some minor differences as discussed below.

The Team Information page comprises season team results, season roster, and season statistics sections. Season team results are a compiled schedule from the OPC Team Schedule that lists the date, location, opponent, event name, result, and score (for college teams, this also includes statistics). The season team results are obtained from the CDE and live scoring components discussed above. The user can select a date or event name to be directed to a match-by-match listing for that competition.

The season roster section is a roster listing of the team, displayed in a table or similar format, listing first and last name, gender, grade, weight class, and season record for each member of the roster (for college teams, this also includes eligibility year, division record, division win %, and rank). By selecting the individual's first or last name, the user is directed to the individual Wrestler Information page.

The season statistics section of the Team Information pages lists every statistical category kept in the database for both value scored and value allowed.

The Wrestler Information page comprises wrestler information, season statistics, and season results sections. The wrestler information section provides a brief overview of the wrestler, and provides last name, first name, school, state, grade, gender, weight class, and record (for college wrestlers, this also includes division, conference, eligibility year, division record, division win %, and rank).

The season statistics section provides every statistical category kept in the database for both value scored and value allowed. It may be presented in table form. It comprises all statistical categories the database captures about every result entered by the CDE or live scoring.

The seasons results section provides the entire year match results for the wrestler, including date, opponent name, opponent school, weight class, result, win type, score, and tourney place. It may be presented in table form. If the opponent name and school were selected from the system (i.e., not typed into the text entry inside the CDE page), the opponent name and opponent school name provide dynamic links to the opponent Wrestler Information page and opponent Team Information page, respectively. Selecting the date shows all matches for that competition under that Master ID, and shows the match details of that particular match if the match was scored using live scoring.

A user may search for a team or wrestler using the Main Search component. Searches may be performed using filters, which may be presented as drop-down menu options, or as text box entry. The Main Search component allows three different filtering options when searching for college teams: school name, division, or conference. The school name filter provides the name for all schools in the system. The division and conference filters provide a list of all teams matching the selected division or conference. The output displayed for all options for college teams includes, but is not limited to, school, state, division, conference, and record. Selecting the team name also will take the user to the Team Information page.

For high school teams, the Main Search component operates in the same way, except that it provides two filtering options: school name, or state. The state filter provides a list of all teams matching the selected state. In addition, the output displayed may be limited to school name, state, and record.

Searching for wrestlers also may be accomplished using different filter options. For college wrestlers, the search filters include, but are not limited to, last name, first name, school, eligibility year, gender, weight class, division, and conference. The output for college wrestlers includes, but is not limited to, school, state, division, conference, last name, first name, eligibility year, gender, weight class and record. For high school wrestlers, the search filters include, but are not limited to, last name, first name, school, grade, gender, weight class, and state. Output for high school wrestlers includes, but is not limited to, school, state, last name, first name, grade, gender, weight class and record. In both cases, selecting the wrestler name will take the user to the Wrestler Information page.

The Wrestler Statistics Report component allows the user to view statistical leaders in various categories, depending on whether the wrestler is a high school or college athlete. Inquiries may be performed using filters, which may be presented as drop-down menu options, or as text box entry. These include, but are not limited to, school year, top count (10, 20, 30, and so on), gender, statistic, state, weight class, and grade or school year (for college wrestlers, these also include conference, division, and eligibility year). Returned values are those submitted through CDE or live scoring. Output may be presented in table form, and includes, but is not limited to, rank, statistic count, full name, school, state, weight class, gender, grade or school year, and record (for college wrestlers, division, conference and eligibility year also may be included). The wrestler names and school names may be dynamically linked to the respective Wrestler Information and Team Information pages, respectively.

The Team Statistics Report component provides statistics reports in a similar fashion to the Wrestler Statistics Report component, except that team statistical data is being searched instead of wrestler statistical data. Filters include, but are not limited to, school year, statistic, state, and top count (and division and conference, for colleges). Output includes, but is not limited to rank, statistic count, school, state, record (and division and conference, for colleges). Dynamic links based on school names also may be provided.

The Meet Results Report component provides reports about any competitions in the scorebook system submitted through CDE or live scoring. Inquiries may be performed using filters, which may be presented as drop-down menu options, or as text box entry. Filters include, but are not limited to, school year, school, state, and competition type (dual vs. tournament), and may be combined with a calendar start/end date function, which returns all competitions that meet the filtering options inside the dates specified. For college meets, filters also include conference and division. Output may be presented in table form, and includes, but is not limited to, date, team, state, opponent, location, event name, result and score. From the output, the user can click on the date, which will present the match listings for that team at that event. Selecting the school name will direct the user to the Team Information page for that school.

The Live Meets Results Report component is similar to the Meet Results Reports component discussed above, except that the competition was or is being scored lived, or using the live scorebook. Output thus also includes the status of the meet (e.g., "in progress"). From the output, the user can click on the date, which will present the match listings for that team at that event. Selecting the school name will direct the user to the Team Information page for that school.

The Seeding Reports component updates a wrestler's seeding or ranking criteria based on updates to the wrestler's individual season record form (which is updated as results are entered into the scorebook application).

For college teams, the Conference Standings component provides conference standings for a selected conference. The user selects a particular conference, which may be by means of a text box or drop-down menu. Output includes, but is not limited to, school name, overall record, overall %, conference record, and conference %. Selecting the school name directs the user to the Team Information page for that school.

As discussed above, competition specific statistical data at the college level also may be provided. On the Team Information page, the season team results section may provide a "Stats" button for each competition. Clicking on this button breaks the competition down into three separate components:

1. Team Statistics—Competition specific statistical information (same statistical components as on the Team Information page, just competition specific).
2. Individual Statistics—Comprehensive breakdown of each individual wrestler's statistics for each match wrestled.
3. Individual Statistics by Period—Individual wrestler's statistics for each match wrestled, further broken down by each period.

Further, match data can be accessed from within a Team Information page, a Wrestler Information page, or several other reports. When a competition date or time is selected from any such report or page, the user is provided the match listings for that school at that particular competition. The user then has the option of saving and opening the listed results in a text, PDF, Excel, or other similar file format. If the competition was entered using the live scoring system, clicking on the weight class or the "view" button directs the user to a match commentary and details listing for that match.

In order to provide a context for the various aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), network PCs, minicomputers, mainframe computers, embedded systems, distributed computing environments, and the like.

Embodiments of the invention may be implemented in the form of computer-executable instructions, such as program code or program modules, being executed by a computer or computing device. Program code or modules may include programs, objections, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices.

In one embodiment, a computer system comprises multiple client devices in communication with at least one server device through or over a network. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

Thus, it should be understood that the embodiments and examples have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art, and variations and changes may be made by those skilled in the art without departing from the spirit of the invention.

What is claimed is:

1. A computer-based system for managing a high school or college wrestling team, comprising:
   a computing device with a microprocessor in electronic communication with one or more databases or computer readable media storing information about a high school or college wrestling team;
   wherein the microprocessor is programmed to permit a user to:
      enter the high school or college wrestling team in a competition;
      upon selecting the competition from a list, view all wrestlers in the competition, eligible weight class of the wrestlers, and lowest eligible weight class of the wrestlers for date of the competition; and
      enter results of the competition for storage in one or more databases,
   wherein the information about the high school or college wrestling team comprises data about individual wrestlers on the high school or college wrestling team comprising at least one of the following: date of initial assessment, weight of the individual wrestler at time of initial assessment, body fat % of the individual wrestler at time of initial assessment, minimum wrestling weight prior to variance, minimum wrestling weight after variance, final minimum wrestling weight, minimum weight class, and first date at minimum weight class.

2. The system of claim 1, further wherein the microprocessor is programmed to permit a user to enter results of the competition while the competition is ongoing.

3. The system of claim 1, further wherein the databases or computer readable media storing information about a high school or college wrestling team are remote from the computing device, and the electronic communication is through the Internet, and
   wherein the one or more databases storing results of the competition are remote from the computing device.

4. The system of claim 1, further wherein the microprocessor is programmed to create brackets for the competition.

5. The system of claim 4, further wherein the brackets are automatically updated while the competition is ongoing based upon the results of the competition which also are updated while the competition is ongoing.

6. The system of claim 1, further wherein the microprocessor is programmed to permit a user to enter, add, update, modify, or delete information about a high school or college wrestling team, or about one or more individuals on a high school or college wrestling team.

7. The system of claim 1, further wherein the microprocessor is programmed to permit a user to enter information about a competition.

8. The system of claim 1, further wherein the microprocessor is programmed to permit a user to change the weight class for a wrestler.

9. A computer-based system for storing and analyzing data about a high school or college wrestling team, comprising:
   at least one computer server with a microprocessor in electronic communication with a database storing information about high school or college wrestling teams and individual athletes;
   wherein the microprocessor is programmed to:
      provide information about a high school or college wrestling team or individual athlete in response to a request;
      provide a screen comprising all wrestlers in the competition, eligible weight class of the wrestlers, and lowest eligible weight class of the wrestlers for date of the competition;
      receive information about the results of an athletic competition; and
      update the information about the high school or college wrestling team or individual athlete based on the athletic competition results information,
   wherein the information about the individual athlete comprises at least one of the following: date of initial assessment, weight of the individual wrestler at time of initial assessment, body fat % of the individual wrestler at time of initial assessment, minimum wrestling weight prior to variance, minimum wrestling weight after variance, final minimum wrestling weight, minimum weight class, and first date at minimum weight class.

10. The system of claim 9, wherein the request is received from a remote computing device in electronic communication with the computer server, and
    wherein the electronic communication is through the Internet.

11. The system of claim 9, further wherein the microprocessor is programmed to provide statistical information or analytical information about the high school or college wrestling team, individual athlete, or athletic competition.

12. The system of claim 9, wherein the athletic competition results information is received while the competition is still ongoing.

13. The system of claim 9, wherein the athletic competition results information is received after the competition has concluded.

14. The system of claim 9, wherein the information about an individual athlete includes weight or weight class.

15. A non-transitory computer-readable storage medium with an executable program stored thereon, wherein the program instructs a microprocessor to perform the following steps:
   providing information about a high school or college wrestling team or individual wrestler in response to a request;
   providing a screen comprising all wrestlers in the competition, eligible weight class of the wrestlers, and lowest eligible weight class of the wrestlers for date of the competition in response to a request;
   receiving information about the results of a wrestling competition; and
   updating the information about a high school or college wrestling team or individual wrestler based on the wrestling competition results information,
   wherein the information about the individual wrestler comprises at least one of the following: date of initial assessment, weight of the individual wrestler at time of initial assessment, body fat % of the individual wrestler at time of initial assessment, minimum wrestling weight prior to variance, minimum wrestling weight after variance, final minimum wrestling weight, minimum weight class, and first date at minimum weight class.

16. The computer medium of claim 15, further wherein the microprocessor performs the step of calculating statistical information or analytical information about the high school or college wrestling team, individual wrestler, or wrestling competition.

17. The computer medium of claim 15, further where the microprocessor performs the step of entering, adding, updating, modifying, or deleting information about a high school or college wrestling team or individual wrestler.

18. The computer medium of claim 15, wherein the information about the individual wrestler comprises at least one of the following: date of assessment, hydration level, body weight, assessment data, skinfold measurements, body density, body fat, fat weight, fat free weight, lowest allowable weight, number of days between assessment and deadline date by governing body, lowest allowable weight, minimum wrestling weight, designated weight class, person performing assessment, and person entering information.

19. A method for storing and analyzing wrestling data, comprising the steps of:
   storing information about high school or college wrestling teams and individual wrestlers in one or more databases in electronic communication with a computer server with a microprocessor;
   providing information about a high school or college wrestling team or individual wrestler in response to a request;
   providing a screen comprising all wrestlers in the competition, eligible weight class of the wrestlers, and lowest eligible weight class of the wrestlers for date of the competition in response to a request;
   receiving information about the results of a wrestling competition; and
   updating the information about a high school or college wrestling team or individual wrestler based on the wrestling competition results information,
   wherein the information about the individual wrestler comprises at least one of the following: date of initial assessment, weight of the individual wrestler at time of initial assessment, body fat % of the individual wrestler at time of initial assessment, minimum wrestling weight prior to variance, minimum wrestling weight after variance, final minimum wrestling weight, minimum weight class, and first date at minimum weight class.

20. The method of claim 19, wherein the wrestling competition results information is received while the competition is still ongoing.

* * * * *